US009144108B2

(12) United States Patent
Song et al.

(10) Patent No.: US 9,144,108 B2
(45) Date of Patent: Sep. 22, 2015

(54) LINK ADAPTATION IN TYPE-II RELAY NETWORK

(75) Inventors: Xinghua Song, Beijing (CN); Jiansong Gan, Beijing (CN); Yin Liu, Beijing (CN); Yu Qian, Beijing (CN); Jianfeng Wang, Beijing (CN)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 288 days.

(21) Appl. No.: 13/574,008

(22) PCT Filed: Feb. 11, 2010

(86) PCT No.: PCT/CN2010/000195
§ 371 (c)(1),
(2), (4) Date: Jul. 19, 2012

(87) PCT Pub. No.: WO2011/097758
PCT Pub. Date: Aug. 18, 2011

(65) Prior Publication Data
US 2012/0294228 A1    Nov. 22, 2012

(51) Int. Cl.
*H04L 12/28* (2006.01)
*H04W 88/04* (2009.01)
*H04J 1/16* (2006.01)
*H04W 72/04* (2009.01)

(52) U.S. Cl.
CPC .............. *H04W 88/04* (2013.01); *H04W 72/04* (2013.01)

(58) Field of Classification Search
USPC .......................... 370/252, 278, 329, 430, 315
See application file for complete search history.

(56) References Cited

U.S. PATENT DOCUMENTS

| 8,849,291 | B2* | 9/2014 | Yu et al. ................. 455/450 |
| 2004/0100911 | A1 | 5/2004 | Kwan et al. |
| 2010/0128622 | A1 | 5/2010 | Horiuchi et al. |
| 2012/0069795 | A1* | 3/2012 | Chung et al. .......... 370/315 |
| 2012/0201191 | A1* | 8/2012 | Seo et al. ............... 370/315 |
| 2013/0003560 | A1 | 1/2013 | Lundevall et al. |

FOREIGN PATENT DOCUMENTS

| CN | 101511121 B | 8/2009 |
| EP | 1 568 168 | 8/2005 |
| EP | 1 926 339 A2 | 5/2008 |
| EP | 2 101 528 A1 | 9/2009 |

(Continued)

OTHER PUBLICATIONS

International Search Report issued in corresponding International application No. PCT/CN2010/000195, mailed Nov. 11, 2010.

(Continued)

*Primary Examiner* — John Pezzlo
(74) *Attorney, Agent, or Firm* — Patent Portfolio Builders PLLC

(57) ABSTRACT

This invention is related to the link adaptation for the downlink transmission in type-II relay network. An method in an eNodeB for adapting link for downlink transmission in type-II relay network, said type-II relay network comprises the eNodeB, one or more relay nodes and a plurality of User Equipments (UE), the method comprises the steps of: classifying the plurality of UEs into two groups: macro-UEs which are served directly by the eNodeB without the help of the one or more relay nodes, and relay-UEs which are served by the eNodeB and the one or more relay nodes; and adapting link for the macro-UEs and the relay-UEs separately.

28 Claims, 3 Drawing Sheets

(56) References Cited

FOREIGN PATENT DOCUMENTS

| WO | 2008/142837 A1 | 11/2008 |
|---|---|---|
| WO | 2009/010906 A2 | 1/2009 |
| WO | 2009/027953 A2 | 3/2009 |

OTHER PUBLICATIONS

Search Report of Chinese Application No. 201080063597.4 dated Oct. 14, 2014.
English translation of First Office Action in of Chinese Application No. 201080063597.4 dated Oct. 14, 2014.
Huawei; "Issues of Type 2 Relay"; 3GPP TSG RAN WG1 Meeting #57bis; R1-092372; Jun. 29-Jul. 3, 2009; pp. 1-7; Los Angeles, CA.
Alcatel-Lucent Shanghai Bell; "Consideration on Type II Relay UE selection and CRS Channel"; 3GPP TSG RAN WG1 Meeting #57; R1-092153; May 4-8, 2009; pp. 1-5; San Francisco, CA.
LTE-3GPP; 3rd Generation Partnership Project; Technical Specification Group Radio Access Network; Evolved Universal Terrestrial Radio Access (E-UTRA); Physical layer procedures (Release 8); eGPP TS 36.213 V8.8.0; Sep. 2009; pp. 1-77; Valbonne, France.
Alcatel-Lucent Shanghai Bell; "Text proposal to support Type II Relay" 3GPP TSG RAN WG1 Meeting #58; R1-093718; p. 1; Aug. 24-28, 2009; Shenzhen, China.
Ericsson, ST-Ericsson; "On channel reciprocity for enhanced DL Multi-Antenna transmission"; TSG-RAN WG1 #59; R1-094443; pp. 1-4; Nov. 9-13, 2009; Jeju, Korea.
Extended Search Report issued in corresponding European patent application No. EP 10 845 432.3, dated Apr. 8, 2015.
ZTE, "Impact of Insufficient Link Adaptation in Type II Relay," 3GPP Draft; TSG-RAN WG1 #58,R1-093199, 3rd Generation Partnership Project (3GPP), Mobile Competence Centre, 650, Route des Lucioles, F-06921 Sophia-Antipolis Cedex, France, Shenzhen, China, Aug. 24-29, 2009, XP050351552.
Office Action mailed Jul. 6, 2015 in related CN Application No. 201080063597.4 (reference previously cited in IDS Dec. 30, 2014).

* cited by examiner

LINK ADAPTATION IN TYPE-II RELAY NETWORK

TECHNICAL FIELD

This invention is related to the link adaptation for the downlink transmission in type-II relay network.

BACKGROUND

In LTE-Advanced systems, relaying will be used to enhance coverage and increase data rate at cell borders without increasing the number of base stations.

Type-II relay, also named L2 relay, is considered to be one of the potential technology components of LTE-Advanced. A type-II relay node is an in-band relaying node characterized by the following [1]:

- It does not have a separate Physical Cell ID and thus would not create any new cells.
- It is transparent to Rel-8 UEs (User Equipments); a Rel-8 UE is not aware of the presence of a type-II relay node.
- It can transmit PDSCH (Physical Downlink Shared Channel).
- It does not transmit CRS (Common Reference Signal) and PDCCH (physical downlink control channel).

As type-II relay does not have PDCCH, the downlink control coverage can not be extended. The major advantage of type-II relays is transmission rate improvement. However, the system design should be revisited carefully considering the new additional node and its specific characteristics. One of the most important aspects is link adaptation which is crucial to the system throughput as well as user experience and quality of services.

Type-II Relay Operation

Due to the transparency of type-II relay, the UE is not aware of the presence of the relay although it is receiving help on the data channel. In this invention, synchronous non-adaptive HARQ (Hybrid Automatic Repeat reQuest) is assumed in order to simplify the design. More complex schemes can be considered as well. However, the potential benefits have to be traded off against flexibility and overhead of HARQ timelines. A relay-assisted downlink transmission consists of two phases as shown in FIG. 1:

First transmission: In the first phase, the eNodeB will transmit data to the UE and the relay will sniff the data at the same time. Both the UE and the relay will try to decode the data. However, in order to exploit gain of the relay-assisted transmission, there is a high probability that the UE can not decode the packet in this first transmission attempt so that re-transmission happens in the second phase.

Re-transmission: In the second phase, the eNodeB and the helping relay will transmit the data to the UE. As a result, the UE receives boosted signal strength by means of over-the-air combining of the direct link which is from the eNodeB to the UE (eNodeB→UE) and the access link which is from the RN (Relay Node) to the UE (RN→UE). In addition, the soft bit information from the first transmission can also be exploited via chase combining or incremental redundancy. This is a further improvement at the cost of additional memories and computation complexity.

It should be noted that for synchronous non-adaptive HARQ transmission, a common modulation and coding scheme (MCS) is selected for the first transmission and re-transmissions. Moreover, this MCS scheme is selected to fit for the quality of the combined channel of the direct link and the access link. The behind reason is that relay-assisted transmission is expected to improve the overall performance than direct transmission. The combined channel can be a sum of the channel gain of direct link and access link (or even better if the first the transmission is also exploited). In typical deployment of type-II relays, the channel quality of the access link is much better than the direct link. As a result, the combined link is much better than the direct link.

Outer-Loop Link Adaptation

Link adaptation is adopted in most of the modern wireless communication systems. Crucial to the working of fast link adaptation is the timely reporting of channel conditions that is fed back from the receiver to the transmitter. A generic term "channel quality indicator" (CQI) is often used to refer to any of such feedback, comprising SNR (Signal to Noise Ratio) and SINR (Signal to Interference Plus Noise Ratio), etc. In a LTE system, common reference signals (CRS) is used to do CQI measurement and different kinds of channel quality indicator can be reported to support flexible scheduling methods.

However, the delays of CQI reporting (including the propagation delay and the processing delay) as well as the time varying channel conditions and interference conditions pose big challenges to link adaptation. The selected MCS based on reported CQI may not be proper for the data transmission. Aggressive MCS selection will cause high block error rate (BLER) while conservative MCS selection will result in low spectrum utilization.

An outer-loop link adaptation can be used to dynamically control the average BLER for the first transmissions based on the acknowledgement feedback (ACK/NACK) from the UE [2]. It follows the same principle as the traditional outer loop power control algorithm for dedicated channels in IS-95 and WCDMA and for HSDPA. Here we define an offset factor A. If an ACK is received for a first transmission, the offset factor A is increased by one preset step $A_{up}$, while it is decreased by one preset step $A_{down}$ if a NACK is received. The modified offset factor A then provides a modified CQI which is used as a basis for selecting MCS. The ratio between $A_{up}$ and $A_{down}$ determines the average BLER that the OLLA converges to, i.e.

$$BLER=1/(1+A_{down}/A_{up}) \qquad (1)$$

For example, if the BLER target is 10%, the ratio of $A_{down}$ and $A_{up}$ should be 9. The configuration for the adjustment steps will have significant impact on the convergence and the stableness of the algorithm. A separate outer-loop link adaptation algorithm is maintained for each user, as users may have different CQI measurement errors and performance.

Problems with Existing Solutions

There are several issues for link adaptation need to be solved in type-II relay network.

Differentiation Between Different Connections

In a type-II relay network, there are two kinds of connections: macro UE connections and relay UE connections, and their corresponding UEs are referred to as macro-UEs and relay-UEs respectively. Different link adaptation methods should be used for the two kinds of connections. For a macro-UE, it does not have a helping relay and is served directly by the eNodeB. For a relay-UE, it is served by the eNodeB and one or more helping relays. Therefore, the eNodeB should have the capability to differentiate these two kinds of connections.

Initial MCS Selection

As mentioned before, a common MCS is selected for the first transmission and retransmissions to adapt to the combined channel. However, the major problem for type-II relay is that it does not have CRS and therefore the channel quality of the access link can not be measured at the UE side. The UE can only measure the channel quality of the direct link through CRS which is configured at the eNodeB. If the eNodeB does traditional link adaptation based on reported CQI of the direct link, the MCS selected will be very conservative, i.e. the combining gain can not be captured. A CQI back-off method can be applied at the eNodeB. However the exact values of the CQI offset are not explicit. In principle, it is related to the relaying gain which is related to the quality of the direct link, the backhaul link and the access link.

Dynamic CQI Adjustment

Another problem is that the dynamic CQI adjustment method proposed in [2] can not be applied directly for type-II relay. If the solution in [2] is used, the CQI will be decreased monotonously upon the NACK for the first transmission. In the end, the BLER target for the first transmission is guaranteed but the relay could not help the UE with the data transmission. This is in contradiction with the design of the relaying node.

SUMMARY

An object of the present invention is to provide a method and an eNodeB so as to alleviate the above disadvantages in the type-II relay network.

According to an aspect of the present invention, there is provided a method in an eNodeB for adapting link for downlink transmission in type-II relay network, said type-II relay network comprises the eNodeB, one or more relay nodes and a plurality of User Equipments (UE), the method comprises the steps of:

classifying the plurality of UEs into two groups: macro-UEs which are served directly by the eNodeB without the help of the one or more relay nodes, and relay-UEs which are served by the eNodeB and the one or more relay nodes; and adapting link for the macro-UEs and the relay-UEs separately.

According to another aspect of the present invention, there is provided an eNodeB for adapting link for downlink transmission in type-II relay network, said type-II relay network comprises the eNodeB, one or more relay nodes and a plurality of UEs, the eNodeB comprises:

classifying means for classifying the plurality of UEs into two groups: macro-UEs which are served directly by the eNodeB without the help of the one or more relay nodes, and relay-UEs which are served by the eNodeB and the one or more relay nodes;

first adapting means for adapting link for the relay-UEs; and second adapting means for adapting link for the macro-UEs.

An advantage of the method and arrangement of the invention is that it provides a improved link adaptation solution for type-II relay network.

Further advantages of embodiments of the invention will become apparent from the description below.

BRIEF DESCRIPTION OF THE DRAWINGS

The invention, together with further objects and advantages thereof, may best be understood by referring to the following description taken together with the accompanying drawings, in which.

ABBREVIATIONS

UE User Equipment
RN Relay Node
DL DownLink
UL UpLink
CQI Channel Quality Indicator
CSI Channel State Information
BLER BLock Error Rate
LTE Long Term Evolution
CRS Common Reference Signal
SRS Sounding Reference Signal
PDCCH Physical Downlink Control CHannel
PDSCH Physical Downlink Shared CHannel
SNR Signal to Noise Ratio
SINR Signal to Interference Plus Noise Ratio

DETAILED DESCRIPTION

The basic concept of the invention is as following:

In the type-II relay network, the eNodeB maintains a UE list to differentiate macro-UEs and relay-UEs. Conventional link adaptation can be applied for macro-UEs while MCS initialization with eNodeB based CQI compensation, dynamic CQI adjustment targeting success of first retransmission is applied for the relay-UEs. Here the UE list is a list to indicate the connections of UEs and relays, e.g. for UE1, UE2 associated with helping relay node RN1: RN1→{UE1, UE2}. The CQI compensation is an offset to CQI decided for MCS selection in link adaptation for downlink transmissions. Dynamic CQI adjustment is adaptive CQI adjustment based on the feedback of ACK/NACK.

Figure 1:
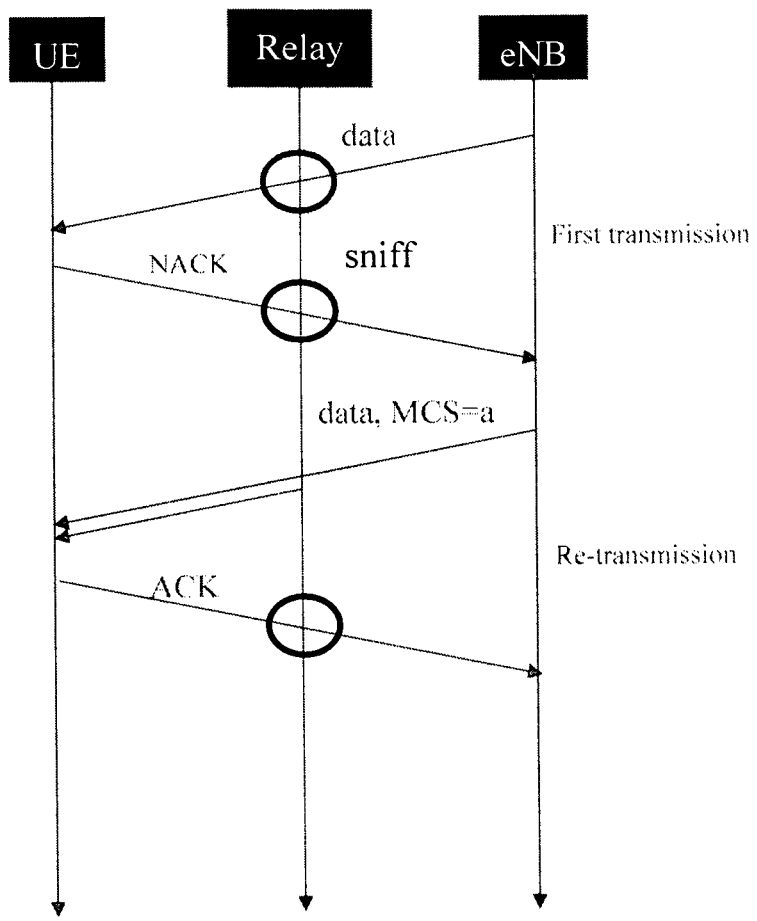
FIG. 1 illustrates typical relay-assisted transmission in type-II relay.
Figure 2:
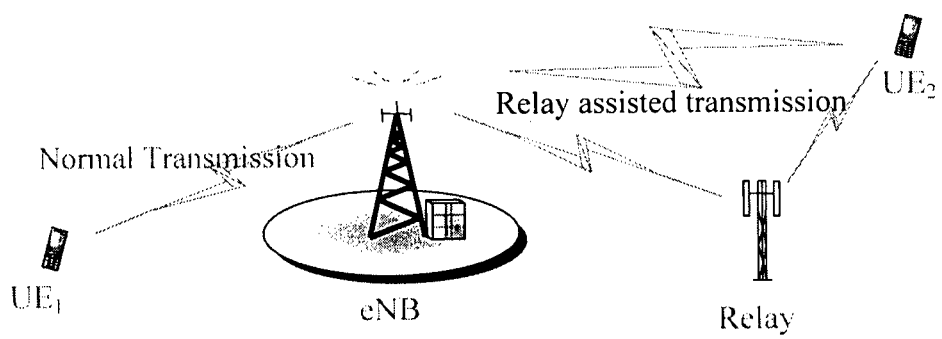
FIG. 2 illustrates the system architecture of type-II relay network.

FIG. 2 illustrates the system architecture of type-II relay network. This network comprises an eNodeB, a relay node and UEs. There are macro-UEs (e.g. $UE_1$) and relay-UEs (e.g. $UE_2$) in the network. The macro-UE follows a conventional link adaptation procedure while the relay-UE follows the proposed link adaptation method in this invention. On backhaul link, there is some information exchange on update of the UE list (eNodeB→EN). For simplicity there are only one relay node and two UEs shown in FIG. 2, but it should be understood that more than more relay nodes and more than two UEs can present in the type-II relay network.

Figure 3:
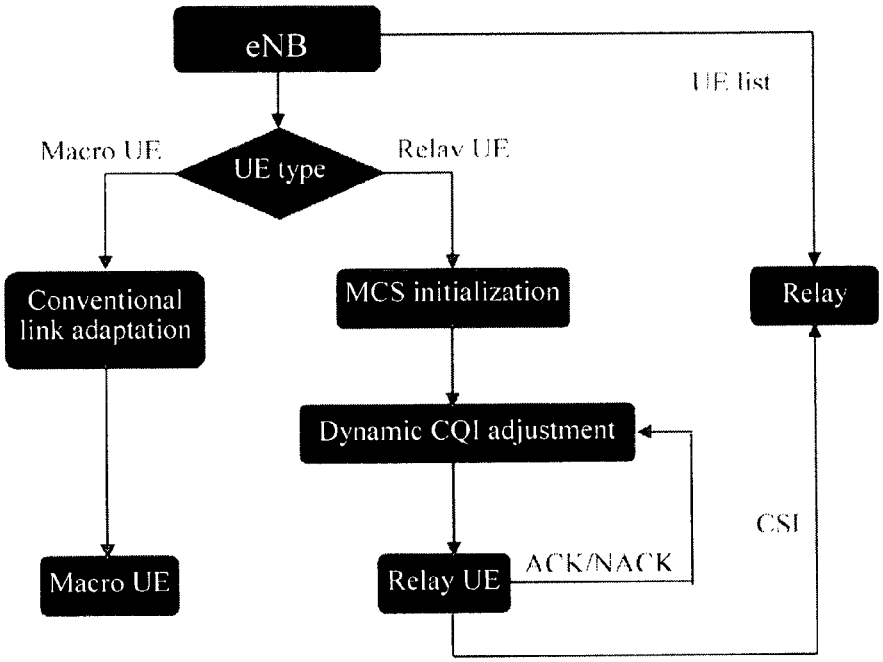
FIG. 3 illustrates a schematic flowchart of a method according to the present invention.

This invention provides an integrated solution for link adaptation in type-II relay network as shown in FIG. 3.

First, the UEs in the network are classified into two groups: macro-UEs and relay-UEs. Then, two different link adaptation methods are applied respectively.

For macro-UEs, conventional link adaptation is adopted including CQI reporting and ACK/NACK based outer-loop link adaptation as mentioned in the background section.

For relay-UEs, the following schemes are proposed:

UE List

The eNodeB maintains a relay-UE association list and broadcasts to all the relays so that each relay gets the list of its affiliated UEs. The relay will help to decode and forward the packets destined for its serving UEs and discard the packets for UEs outside the list.

The relay-UE association list is maintained at the eNodeB. UEs on the list are considered to have low signal quality with respect to the eNodeB and hence need the assistance from relay. Different algorithms can be used to separate macro-UEs and relay-UEs: based on uplink received signal level through sounding reference signals or downlink measurements through downlink pilot symbols.

Algorithms to Create the Relay-UE Association List

The eNodeB creates the relay-UE association list. The update operation on the list such as deletion, addition or modification of the list is triggered by one or more of the following events:

New UEs are entering the system (initial access or via handover)

Radio conditions of existing UEs are changing due to mobility

Existing UE leaves the system

A UE should be associated with a certain relay if the UE is not a macro-UE. The uplink received signal power level at the relay is used to determine the relay-UE association. If the uplink received signal power level at a certain relay node (Rx_RN) is above a certain threshold (Rx_thA), it can be a candidate helping relay for this UE. This relay is expected to be close to the UE. There are also possibilities that several relays can fulfill the above condition for one UE. In this case the relay-UE association is decided by the eNodeB based on the traffic load or resource availability of the relays. The Rx level could be measured by the relay during the initial access (random access channel) or on any other channel during operation or call.

Signaling of Relay-UE Association List to Relays

The relay-UE association list needs to be updated on slow basis or when new users are added and deleted as also described above. Typically the list can be broadcasted by the base station to all its relays. Hence relays can get this list through common signaling.

The list can be transmitted on PDSCH or any other downlink channels between eNodeB and relay. As an example, the relays can be assigned specific "UE" IDs by the eNodeB and informed about the relay-UE association list on allocated time frequency resource blocks.

MCS Initialization

The initial MCS for link adaptation is selected to fit the over-the-air combined channel. Two methods are proposed: random or UE-specific CQI compensation at the eNodeB or channel probing. The CQI compensation herein is an offset to CQI, and provides a compensated CQI for MCS selection in link adaptation for downlink transmissions at the eNodeB.

As described in the background section, the MCS should be selected to fit the combined channel, which is more aggressive than reported MCS which is based on reported CQI of the direct link for the first transmission. Although outer-loop CQI adjustment can be used to adjust the MCS, the convergence time is relatively long. Following algorithms are proposed for the MCS initialization:

Alternative 1: MCS Selection Based on Random CQI Compensation

It is already known at the eNodeB that the relay-UE should select an aggressive MCS than the reported MCS. Thus a random CQI compensation can be used for the MCS selection. The advantage of this method is simplicity. No additional measurement or signaling is needed. The disadvantage is limited performance improvement.

Alternative 2: MCS Selection Based on UE-Specific CQI Compensation

Similar to alternative 1, however a UE-specific CQI compensation can be used in the MCS initialization. This CQI compensation is related to the channel quality of the access link and the direct link. It is defined as relaying gain:

$$G \approx (PL_{access} + PL_{direct})/(PL_{direct}) \quad (2)$$

The large scale parameters such as the pathloss can be measured through uplink transmissions. However, some signaling should be designed to support the information exchange between the relay node and the eNodeB.

Alternative 3: MCS Selection Based on Channel Probing

Figure 4:
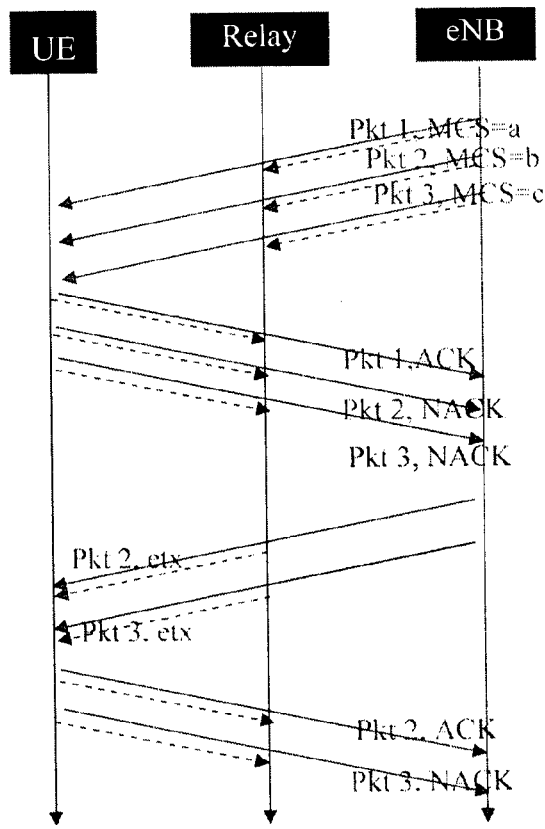
FIG. 4 illustrates MCS initialization based on channel probing.

The MCS selection can also be done though channel probing as it is applied for cellular networks [4]. The whole procedure shown in FIG. 4 consists of the following three steps:

Step 1: Transmit several (e.g. three in FIG. 4) packets with different MCS (a<b<c), these packets could be data or "dummy" packet.

Step 2: Check the ACK/NACK of the re-transmission, and choose the highest MCS which succeeds in the second transmission as the preferred MCS.

Step 3: Skip the ACK/NACK in the first or other non-second transmission in this process. It should be noted that for each MCS, a plurality of packets can be transmitted, thus the MCS which have the highest success rate in the second transmission can be chosen as the preferred MCS. By this way, a highest MCS which could most probably succeed within first retransmission with relay is chosen.

Dynamic CQI Adjustment

A modified dynamic CQI adjustment targeting the success of first retransmission is applied to track the time varying fading and interference.

Here we define the offset factor A, and the CQI changes with A proportionally. The dynamic CQI adjustment for the relay-UEs is described in the following:

First transmission: If an NACK is received for the first transmission, it is skipped and no CQI adjustment is made. If ACK is received for the first transmission, increase A by one preset step $A_{up}$.

Second transmission: If an NACK is received for the second transmission, decrease A by one preset step $A_{down}$. If ACK is received for the second transmission, increase A by one preset step $A_{up}$.

After second transmission: No CQI adjustment will be made no matter ACK or NACK is received for the third and subsequent transmissions. In this way, the CQI can be modified dynamically in order to adjust the MCS.

Figure 5:
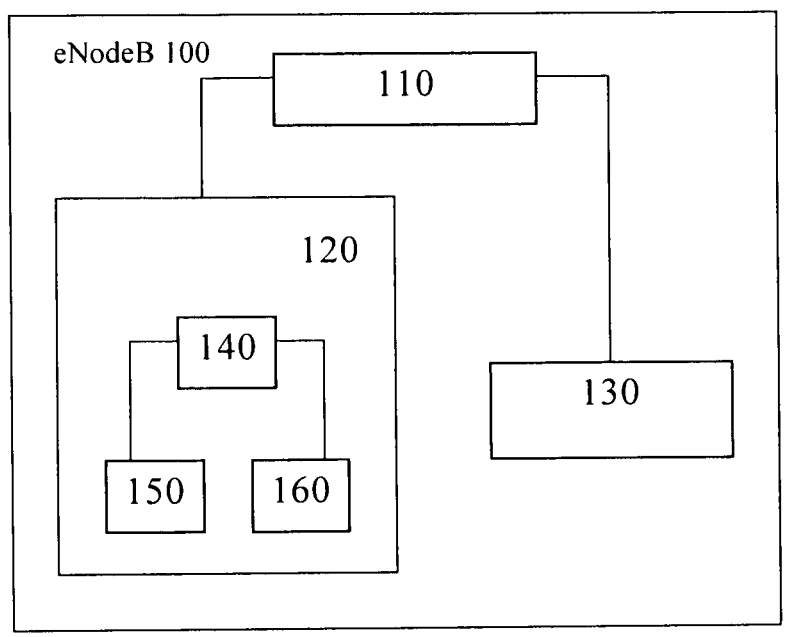
FIG. 5 illustrates a block diagram of an eNodeB according to the present invention.

FIG. 5 illustrates a block diagram of an eNodeB 100 used for adapting link for downlink transmission in a type-II relay network according to the present invention. Said type-II relay network comprises the eNodeB, one or more relay nodes and a plurality of UEs. The eNodeB 100 comprises: classifying means 110, first adapting means 120 and second adapting means 130. Wherein the classifying means 110 is used for classifying the plurality of UEs into two groups: macro-UEs which are served directly by the eNodeB without the help of the one or more relay nodes, and relay-UEs which are served by the eNodeB and the one or more relay nodes; the first adapting means 120 is used for adapting link for the relay-UEs; and the second adapting means 130 is used for adapting link for the macro-UEs.

Further, the classifying means 110 is adapted to separate the macro-UEs and the relay-UEs based on uplink received signal power level through sounding reference signals or downlink measurements through downlink pilot symbols.

Further, the first adapting means 120 comprises list maintaining means 140 for creating a UE list to indicate the association between each of the relay-UEs and its serving relay node, and for signaling this list to the one or more relay nodes.

Further, the list maintaining means 140 is adapted to determine each of the relay-UEs' serving relay node by: selecting for this relay-UE one or more candidate serving relay nodes at which uplink received signal power level from this relay-UE is above a certain threshold, and determining for this relay-UE one serving relay node based on the traffic load or resource availability of the one or more candidate serving relay nodes.

Further, the list maintaining means 140 is adapted to update the UE list in response to one or more of the following events:
New UEs are entering the system—initial access or via handover;
Radio conditions of existing UEs are changing due to mobility; and
Existing UE leaves the system.

Further, the first adapting means 120 also comprises MCS initialization means 150 for selecting for each of the relay-UEs a initial MCS for link adaptation to fit this relay-UE's combined channel which is the combination of a access link and a direct link, wherein the access link is the link from this relay-UE's serving relay node to this relay-UE, the direct link is the link from the eNodeB to this relay-UE.

Further, the MCS initialization means 150 is adapted to select the initial MCS based on random offset.

Alternatively, the MCS initialization means 150 is adapted to select the initial MCS based on UE-specific offset. And the UE-specific offset related to the pathloss of the access link and the direct link, and is defined as relaying gain:

$$G \approx (PL_{access} + PL_{direct})/(PL_{direct})$$

where $PL_{access}$ denotes pathloss of the access link, and $PL_{direct}$ denotes pathloss of the direct link.

Alternatively, the MCS initialization means 150 is adapted to select the initial MCS based on channel probing. And the channel probing (e.g. in FIG. 4) comprises:
transmitting a plurality of packets with different MCS from the eNodeB to each of the relay-UEs, these packets could be data or "dummy" packet;
receiving and checking the ACK/NACK of second transmission during which both the eNodeB and this relay-UE's serving relay node transmit packets to this relay-UE, and choosing the MCS which has the highest success rate in the second transmission as the preferred MCS; and
skipping the ACK/NACK in the first or other non-second transmission in this process.

Further, the first adapting means 120 further comprises CQI adjustment means 160 for applying dynamic CQI adjustment for the relay-UEs. And the CQI adjustment means performs dynamic CQI adjustment by:
defining a offset factor A with which CQI changes proportionally,
first transmission during which the eNodeB transmits to each of the relay-UEs: if an NACK is received for the first transmission, it is skipped and no CQI adjustment is made; if an ACK is received for the first transmission, increase A by one preset step $A_{up}$;
second transmission during which both the eNodeB and this relay-UE's serving relay node transmit to this relay-UE: if an NACK is received for the second transmission, decrease A by one preset step $A_{down}$; if an ACK is received for the second transmission, increase A by one preset step $A_{up}$; and
after second transmission: no CQI adjustment will be made no matter ACK or NACK is received for the third and subsequent transmissions.

Further, the second adapting means 130 is adapted to select MCS based on reported CQI from the macro-UEs to the eNodeB, and to use an outer-loop link adaptation to dynamically control the average BLER for first transmissions from the eNodeB to the macro-UEs based on acknowledgement feedback (ACK/NACK) from the macro-UEs.

Thus, this invention is applicable for downlink transmission in type-II relay network and possesses the following advantages:
Integrated link adaptation solution for type-II relay network
Average cell throughput enhancement with appropriate MCS selection.
Fast convergence in dynamic CQI adjustment.
Applicable to both TDD and FDD systems.

It should be understood that the steps and means mentioned above can be implemented as software, hardware, firmware and their combinations.

It will be understood by those skilled in the art that various modifications and changes can be made to the present invention without departure from the scope thereof, which is defined by the appended claims.

REFERENCES

[1] R1-093718, "Text proposal to support Type II Relay", Alcatel-Lucent, Alcatel-Lucent Shanghai Bell, CATT, CEWiT, CMCC, CHTTL, Fujitsu, Hitachi, InterDigital, ITRI, LGE, RIM, RITT, Vodafone, ZTE
[2] Patent PCT/IB2003/004530, "Method for link adaptation", Kwan Raymond, Pedersen Klaus Ingemann, Mogensen Preben, Kolding Troels, 2004.
[3] 3GPP Technical Specifications 36.213, "Physical Layer Procedures", 2009.
[4] Patent P30418, "Channel quality probing", Qian Yu, Jessica Östergaard, Henning Wiemann, Magnus Lundevall.
[5] R1-094443, "On channel reciprocity for enhanced DL Multi-Antenna transmission", Ericsson. ST-Ericsson

The invention claimed is:

1. A method in an eNodeB for adapting link for downlink transmission in type-II relay network, said type-II relay network comprises the eNodeB, one or more relay nodes and a plurality of User Equipments (UE), the method comprises the steps of:
classifying the plurality of UEs into two groups: macro-UEs which are served directly by the eNodeB without the help of the one or more relay nodes, and relay-UEs which are served by the eNodeB and the one or more relay nodes;
performing link adaptation for the macro-UEs; and
performing, separately from the link adaptation for the macro-UEs, link adaptation for the relay-UEs.

2. The method according to claim 1, wherein the step of classifying the one or more UEs into two groups comprises: separating the macro-UEs and the relay-UEs based on uplink received signal power level through sounding reference signals or downlink measurements through downlink pilot symbols.

3. The method according claim 1, wherein the step of adapting link for the relay-UEs comprises: creating a UE list to indicate the association between each of the relay-UEs and its serving relay node, and signaling this list to the one or more relay nodes.

4. The method according to claim 3, wherein each of the relay-UEs' serving relay node is determined by: selecting for this relay-UE one or more candidate serving relay nodes at which uplink received signal power level from this relay-UE is above a certain threshold, and determining for this relay-UE one serving relay node based on the traffic load or resource availability of the one or more candidate serving relay nodes.

5. The method according to claims 3, wherein the UE list is updated in response to one or more of the following events:
   new UEs are entering the system—initial access or via handover;
   radio conditions of existing UEs are changing due to mobility; and
   existing UE leaves the system.

6. The method according to claim 1, wherein the step of adapting link for the relay-UEs further comprises: selecting for each of the relay-UEs an initial Modulation and Coding Scheme (MCS) for link adaptation to fit this relay-UE's combined channel which is the combination of a access link and a direct link, wherein the access link is the link from this relay-UE's serving relay node to this relay-UE, and the direct link is the link from the eNodeB to this relay-UE.

7. The method according to claim 6, wherein the initial MCS is selected based on random CQI compensation.

8. The method according to claim 6, wherein the initial MCS is selected based on UE-specific CQI compensation.

9. The method according to claim 8, wherein the UE-specific CQI compensation is related to pathloss of the access link and the direct link, and is defined as relaying gain:

$$G \approx (PL_{access} + PL_{direct})/(PL_{direct})$$

where $PL_{access}$ denotes pathloss of the access link, and $PL_{direct}$ denotes pathloss of the direct link.

10. The method according to claim 6, wherein the initial MCS is selected based on channel probing.

11. The method according to claim 10, wherein the channel probing comprises:
   transmitting a plurality of packets with different MCS from the eNodeB to each of the relay-UEs;
   receiving and checking the ACK/NACK of second transmission during which both the eNodeB and this relay-UE's serving relay node transmit packets to this relay-UE, and choosing the MCS which has the highest success rate in the second transmission as the preferred MCS; and
   skipping the ACK/NACK in the first or other non-second transmission in this process.

12. The method according to claim 1, wherein the step of adapting link for the relay-UEs further comprises: applying dynamic Channel Quality Indicator (CQI) adjustment for the relay-UEs.

13. The method according to claim 12, wherein the dynamic CQI adjustment comprises:
   defining an offset factor A with which CQI changes proportionally,
   first transmission during which the eNodeB transmits to each of the relay-UEs: if a NACK is received for the first transmission, it is skipped and no CQI adjustment is made; if an ACK is received for the first transmission, increase A by one preset step $A_{up}$;
   second transmission during which both the eNodeB and this relay-UE's serving relay node transmit to this relay-UE: if a NACK is received for the second transmission, decrease A by one preset step $A_{down}$; if an ACK is received for the second transmission, increase A by one preset step $A_{up}$; and
   after second transmission: no CQI adjustment will be made no matter ACK or NACK is received for the third and subsequent transmissions.

14. The method according to claim 1, wherein the step of adapting link for the macro-UEs comprises: selecting MCS based on reported CQI from the macro-UEs to the eNodeB, and using an outer-loop link adaptation to dynamically control the average Block Error Rate (BLER) for first transmissions from the eNodeB to the macro-UEs based on acknowledgement feedback (ACK/NACK) from the macro-UEs.

15. An eNodeB for adapting link for downlink transmission in type-II relay network, said type-II relay network comprises the eNodeB, one or more relay nodes and a plurality of UEs, the eNodeB comprises:
   classifying means for classifying the plurality of UEs into two groups: macro-UEs which are served directly by the eNodeB without the help of the one or more relay nodes, and relay-UEs which are served by the eNodeB and the one or more relay nodes;
   first adapting means for adapting link for the relay-UEs; and
   second adapting means for adapting link for the macro-UEs, wherein the second adapting means is performed separately from the first adapting means.

16. The eNodeB according to claim 15, wherein the classifying means is adapted to separate the macro-UEs and the relay-UEs based on uplink received signal power level through sounding reference signals or downlink measurements through downlink pilot symbols.

17. The eNodeB according to claim 15, wherein the first adapting means comprises list maintaining means for creating a UE list to indicate the association between each of the relay-UEs and its serving relay node, and for signaling this list to the one or more relay nodes.

18. The eNodeB according to claim 17, wherein the list maintaining means is adapted to determine each of the relay-UEs' serving relay node by: selecting for this relay-UE one or more candidate serving relay nodes at which uplink received signal power level from this relay-UE is above a certain threshold, and determining for this relay-UE one serving relay node based on the traffic load or resource availability of the one or more candidate serving relay nodes.

19. The eNodeB according to claim 17, wherein the list maintaining means is adapted to update the UE list in response to one or more of the following events:
   new UEs are entering the system—initial access or via handover;
   radio conditions of existing UEs are changing due to mobility; and
   existing UE leaves the system.

20. The eNodeB according to claim 15, wherein the first adapting means further comprises MCS initialization means for selecting for each of the relay-UEs an initial MCS for link adaptation to fit this relay-UE's combined channel which is the combination of a access link and a direct link, wherein the access link is the link from this relay-UE's serving relay node to this relay-UE, the direct link is the link from the eNodeB to this relay-UE.

21. The eNodeB according to claim 20, wherein the MCS initialization means is adapted to select the initial MCS based on random offset.

22. The eNodeB according to claim 20, wherein the MCS initialization means is adapted to select the initial MCS based on UE-specific offset.

23. The eNodeB according to claim 22, wherein the UE-specific offset related to the pathloss of the access link and the direct link, and is defined as relaying gain:

$$G \approx (PL_{access} + PL_{direct})/(PL_{direct})$$

where $PL_{access}$ denotes pathloss of the access link, and $PL_{direct}$ denotes pathloss of the direct link.

24. The eNodeB according to claim 20, wherein the MCS initialization means is adapted to select the initial MCS based on channel probing.

25. The eNodeB according to claim 24, wherein the channel probing comprises:
   transmitting a plurality of packets with different MCS from the eNodeB to each of the relay-UEs;
   receiving and checking the ACK/NACK of second transmission during which both the eNodeB and this relay-UE's serving relay node transmit packets to this relay-UE, and choosing the MCS which has the highest success rate in the second transmission as the preferred MCS; and
   skipping the ACK/NACK in the first or other non-second transmission in this process.

26. The eNodeB according to claim 15, wherein the first adapting means further comprises CQI adjustment means for applying dynamic CQI adjustment for the relay-UEs.

27. The eNodeB according to claim 26, wherein the CQI adjustment means performs dynamic CQI adjustment by:
   defining a offset factor A with which CQI changes proportionally,
   first transmission during which the eNodeB transmits to each of the relay-UEs: if a NACK is received for the first transmission, it is skipped and no CQI adjustment is made; if an ACK is received for the first transmission, increase A by one preset step $A_{up}$;
   second transmission during which both the eNodeB and this relay-UE's serving relay node transmit to this relay-UE: if a NACK is received for the second transmission, decrease A by one preset step $A_{down}$; if an ACK is received for the second transmission, increase A by one preset step $A_{up}$; and
   after second transmission: no CQI adjustment will be made no matter ACK or NACK is received for the third and subsequent transmissions.

28. The eNodeB according to claim 15, wherein the second adapting means is adapted to select MCS based on reported CQI from the macro-UEs to the eNodeB, and to use an outer-loop link adaptation to dynamically control the average BLER for first transmissions from the eNodeB to the macro-UEs based on acknowledgement feedback (ACK/NACK) from the macro-UEs.

* * * * *